US008065147B2

(12) United States Patent  
Breuer

(10) Patent No.: US 8,065,147 B2  
(45) Date of Patent: Nov. 22, 2011

(54) GRAMMA GENERATION FOR PASSWORD RECOGNITION

(75) Inventor: Richard Breuer, Alsdorf (DE)

(73) Assignee: Nuance Communications, Inc., Burlington, MA (US)

( * ) Notice: Subject to any disclaimer, the term of this patent is extended or adjusted under 35 U.S.C. 154(b) by 1096 days.

(21) Appl. No.: 11/859,317

(22) Filed: Sep. 21, 2007

(65) Prior Publication Data

US 2008/0077405 A1    Mar. 27, 2008

Related U.S. Application Data

(60) Provisional application No. 60/826,400, filed on Sep. 21, 2006.

(51) Int. Cl.
  *G10L 15/18* (2006.01)
  *G10L 15/28* (2006.01)
  *G10L 15/00* (2006.01)
  *G10L 21/00* (2006.01)

(52) U.S. Cl. .......... 704/257; 704/255; 704/273

(58) Field of Classification Search .......... None
See application file for complete search history.

(56) References Cited

U.S. PATENT DOCUMENTS

| | | | | |
|---|---|---|---|---|
| 5,913,192 A * | 6/1999 | Parthasarathy et al. | .... | 704/256.1 |
| 6,223,158 B1 | 4/2001 | Goldberg | ...... | 704/252 |
| 7,031,923 B1 * | 4/2006 | Chaudhari et al. | ..... | 704/273 |
| 7,599,837 B2 * | 10/2009 | Wang et al. | ..... | 704/257 |
| 2003/0055649 A1 * | 3/2003 | Xu et al. | ..... | 704/270 |
| 2003/0125944 A1 | 7/2003 | Wohlsen et al. | ..... | 704/246 |
| 2007/0083360 A1 * | 4/2007 | Giuseppini | ..... | 704/9 |

FOREIGN PATENT DOCUMENTS

| | | |
|---|---|---|
| EP | 1176493 | 1/2002 |
| WO | WO96/24129 | 8/1996 |

* cited by examiner

*Primary Examiner* — Matthew Sked
(74) *Attorney, Agent, or Firm* — Sunstein Kann Murphy & Timbers LLP

(57) ABSTRACT

A password grammar for speech recognition is described. A password is normalized into a list of strings of a plurality of character types such as letters and numerals. For each string of letters, one or more corresponding letter permutations are determined which represent pronounceable combinations of that string. Then, for each letter permutation, a corresponding recognition grammar entry is created for a speech recognition grammar.

4 Claims, 2 Drawing Sheets

GRAMMA GENERATION FOR PASSWORD RECOGNITION

This application claims priority from U.S. Provisional Patent Application 60/826,400, filed Sep. 21, 2006, the contents of which is hereby incorporated by reference.

Two computer program listing appendices, which are hereby incorporated by reference in their entirety for all purposes, are submitted via the USPTO electronic filing system (EFS) in two files named sample grammar.pdf and sample grammar sentences.txt.

FIELD OF THE INVENTION

The invention generally relates to automatic speech recognition, and more specifically, to a speech recognition grammar for spoken passwords.

BACKGROUND ART

Many computer applications require the user to provide a difficult to predict password, such as Hitt-222X. Typically, such a password must be typed in via a keyboard input device. Although speech recognition is becoming more commonly used for text input, speech recognition of such difficult to predict passwords is more difficult than for normal words.

SUMMARY OF THE INVENTION

Embodiments of the present invention are directed to creating a password grammar for speech recognition. A password is normalized into a list of strings of different character types including letters and numerals. For each string of letters, one or more corresponding letter permutations are determined that represent pronounceable combinations of that string. Then for each letter permutation, a corresponding recognition grammar entry is created for a speech recognition grammar.

In further embodiments, for each string of numerals, one or more corresponding number permutations are also determined which represent pronounceable combinations of that string. And for each number permutation, a corresponding recognition grammar entry is also created for the speech recognition grammar. Similarly, in some embodiments, for each string of non-alpha-numeric characters, one or more corresponding character permutations are also determined which represent pronounceable combinations of that string. And for each character permutation, a corresponding recognition grammar entry is also created for the speech recognition grammar.

The grammar may be, for example, a Speech Recognition Grammar Specification (SRGS) grammar.

DETAILED DESCRIPTION OF SPECIFIC EMBODIMENTS

Embodiments of the present invention are directed to speech recognition techniques for analyzing a user password and creating a grammar for speech recognition of the password. Rejection of wrong passwords is based on the recognizer's features to reject out-of-grammar utterances. In the following discussion, we consider the sample password "Hitt-222X" and a closed Speech Recognition Grammar Specification (SRGS) grammar is created. Of course, this is simply an illustrative example which should not be understood to limit the scope of the invention.

Figure 1:
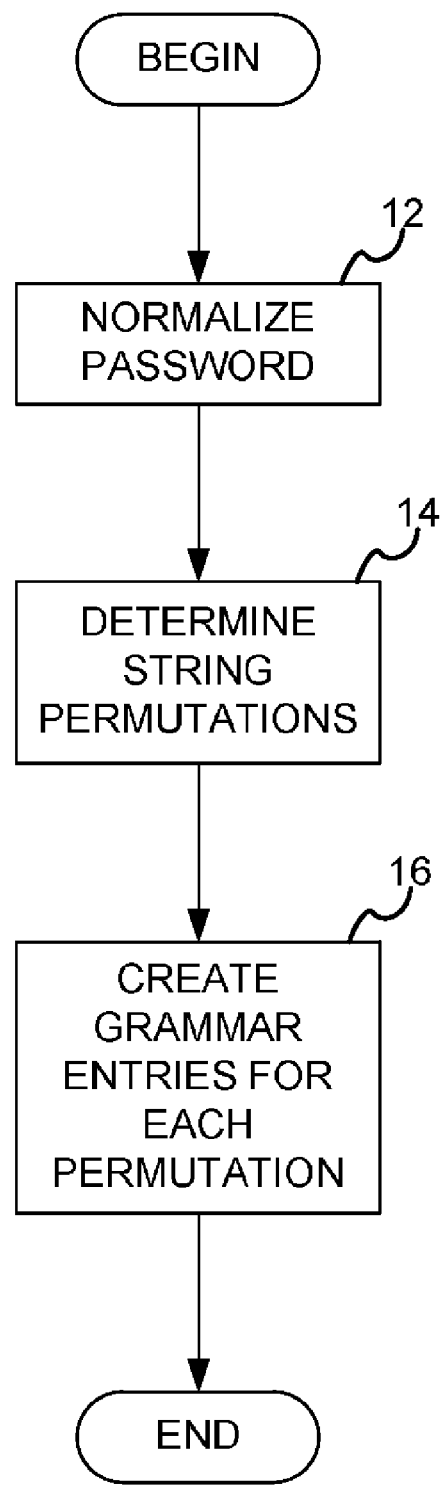
FIG. 1 shows a flow chart of major functional steps for creating a speech recognition password grammar according to an embodiment of the present invention.
Figure 2:
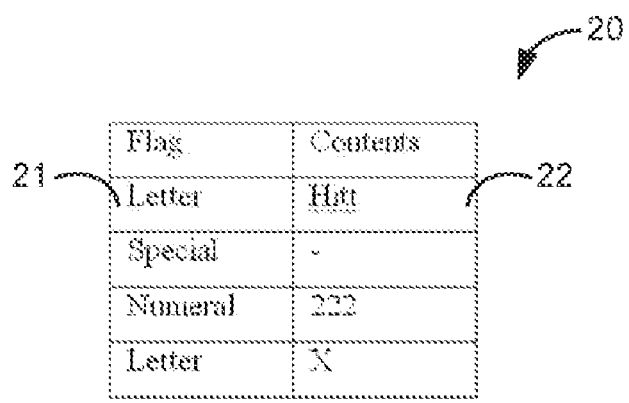
FIG. 2 shows a normalized listing of a password according to an embodiment.

FIG. 1 shows a flow chart of major functional steps for creating a speech recognition password grammar according to one specific embodiment of the present invention. Initially, an existing password is normalized into a list of strings containing numeral strings or digits, strings of letters or single letters, and special characters, step 12. For example, as shown in FIG. 2, the password 20 Hitt-222X is normalized to a letter string 21 with a value of Hitt 22, a special string -, a numeral string 222, and another letter string X.

Figure 3:
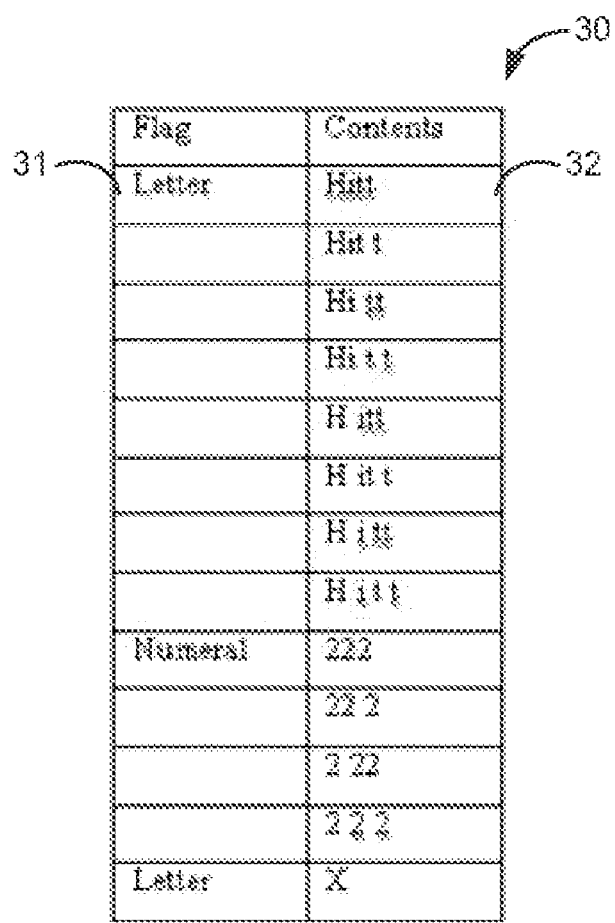
FIG. 3 shows a permutation listing of a password according to an embodiment.

Next, all the characters sequences—letters, numbers, and non-alphanumeric characters—are processed by creating permutations of all possible and meaningful substrings so as to determine string permutations, step 14. This is to create grammar paths containing all pronounceable substrings. More specifically, all possible permutations 30 are created as shown in FIG. 3. So for example, the letter string 31 Hitt 32 is permutated into all possible variations of that string, Hit t, Hi tt, Hi t t, etc. Then all letter permutations are removed that contain sequences longer than one letter without a vowel, which do not consist of all the same character, assuming these cannot/will not be spoken. In the example, nothing will change, since the combinations "H i tt" and "Hi tt" which would be removed, contain "tt", a sequence of the letter "t". Therefore they are not removed.

Once the string permutations have been developed, a grammar entry is created for each remaining permutation, step 16. For example, in one specific embodiment, the grammar contains one rule "password". This rule contains a <one-of> for all alternative paths through the password. Each <one-of> itself is a sequence of tokens. Each token is created from one entry in the result list. For each non-alphanumeric character, a reference to a matching predefined rule is created, e.g. <ruleref uri="#hyphen"/>. If the first letter is lowercase, a <ruleref uri="#lower"/> is created, otherwise <ruleref uri="#upper"/>. #lower and #upper are predefined rules, e.g.:

```
<rule id="upper">
    <item repeat="0-1">upper case</item>
</rule>
<rule id="lower">
    <item repeat="0-1">lower case</item>
</rule>
```

If the sequence does not consist of all the same letter, the (lowercase) sequence of letters itself is put in the rule. Otherwise, if the letters occur two times or more, a "double x" sequence is created, etc. In applicable cases, a "<number> times x" is created. If the number is lower than a maximum (999.999), a natural number is created. Otherwise this alternative is omitted, knowing that shorter sequences are available as well. Additionally, sequences of the same digit are treated specially. If one digit occurs two times, a "double x" sequence is created. In any case "<number> times x" is created.

For the described embodiment, the created U.S. English grammar and a listing of the corresponding parseable phrases are provided in the .txt files of the incorporated computer program listing appendix.

Embodiments of the invention may be implemented in any conventional computer programming language. For example, preferred embodiments may be implemented in a procedural programming language (e.g., C) or an object oriented programming language (e.g., C++ or Perl). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

```
<?xml version="1.0" encoding="ISO-8859-1"?>
<!DOCTYPE grammar PUBLIC "-/ /W3C/ /DTD
GRAMMAR 1.0/ /EN"
      "http:/ /www.w3.org/TR/speech-grammar/grammar.dtd">
<grammar version="1.0"
    xml:lang="en-US"
    mode="voice"
    root="password"
    xmlns="http:/ /www.w3.org/2001/06/grammar"
    xmlns:xsi="http:/ /www.w3.org/2001/XMLSchema-instance"
    xsi:schemaLocation="http:/ /www.w3.org/2001/06/grammar
                    http:/ /www.w3.org/TR/speech-
grammar/grammar.xsd"
    xml:base="http:/ /www.example.com/another-base-file-path">
<rule id="upper">
  <item repeat="0-1">upper case</item>
</rule>
<rule id="lower">
  <item repeat="0-1">lower case</item>
</rule>
<rule id="double">
  double
```

-continued

```
</rule>
<rule id="triple">
  triple
</rule>
<rule id="times">
  times
</rule>
<rule id="minus">
  <item repeat="0-1">
    <one-of>
      <item>minus</item>
    </one-of>
  </item>
</rule>
<rule id="space">
  <item repeat="0-1">
    <one-of>
      <item>space</item>
      <item>blank</item>
    </one-of>
  </item>
</rule>
<rule id="slash">
  <item repeat="0-1">
    <one-of>
      <item>slash</item>
    </one-of>
  </item>
</rule>
<rule id="zero">
  <item repeat="0-1">
    <one-of>
      <item>zero</item>
      <item>null</item>
      <item>o</item>
    </one-of>
  </item>
</rule>
<rule id="password">
  <one-of>
    <item>
        <one-of>
    <item>
        <ruleref uri="#upper"/>h
    </item>
</one-of> <one-of>
    <item>
        <ruleref uri="#lower"/>i
    </item>
</one-of> <one-of>
    <item>
        <ruleref uri="#lower"/>t
    </item>
</one-of> <one-of>
    <item>
        <ruleref uri="#lower"/>t
    </item>
</one-of>
    </item>
    <item>
        <one-of>
    <item>
        <ruleref uri="#upper"/>h
    </item>
</one-of> <one-of>
    <item>
        <ruleref uri="#lower"/>i
    </item>
</one-of> <one-of>
    <item>
        <ruleref uri="#lower"/>tt
    </item>
    <item><one-of><item><ruleref uri="#double"/>t</item>
    <item>two
<ruleref uri="#times"/>t</item></one-of></item>
</one-of>
    </item>
    <item>
        <one-of>
    <item>
```

```
            <ruleref uri="#upper"/>h
          </item>
        </one-of> <one-of>
          <item>
            <ruleref uri="#lower"/>it
          </item>
        </one-of> <one-of>
          <item>
            <ruleref uri="#lower"/>t
          </item>
        </one-of>
      </item>
      <item>
        <one-of>
      <item>
            <ruleref uri="#upper"/>h
          </item>
        </one-of> <one-of>
          <item>
            <ruleref uri="#lower"/>itt
          </item>
        </one-of>
      </item>
      <item>
        <one-of>
          <item>
            <ruleref uri="#upper"/>hi
          </item>
        </one-of> <one-of>
          <item>
            <ruleref uri="#lower"/>t
          </item>
        </one-of> <one-of>
          <item>
            <ruleref uri="#lower"/>t
          </item>
        </one-of>
      </item>
      <item>
        <one-of>
      <item>
            <ruleref uri="#upper"/>hi
          </item>
        </one-of> <one-of>
          <item>
            <ruleref uri="#lower"/>tt
          </item>
          <item><one-of><item><ruleref uri="#double"/>t</item>
          <item>two
<ruleref uri="#times"/>t</item></one-of></item>
        </one-of>
      </item>
      <item>
        <one-of>
      <item>
            <ruleref uri="#upper"/>hit
          </item>
        </one-of> <one-of>
          <item>
            <ruleref uri="#lower"/>t
          </item>
        </one-of>
      </item>
      <item>
        <one-of>
      <item>
            <ruleref uri="#upper"/>hitt
          </item>
        </one-of>
      </item>
    </one-of>
    <one-of>
      <item>
        <ruleref uri="#minus"/>
      </item>
```
```
    </one-of>
    <one-of>
      <item>
        <one-of><item>two</item></one-of> <one-of>
<item>two</item></one-of> <one-of><item>two</item>
</one-of>
      </item>
      <item>
        <one-of><item>two</item></one-of> <one-of>
<item>twenty two</item><item><one-of><item><ruleref uri=
"#double"/>two
</item><item>two<ruleref uri="#times"/>two</item></one-of>
</item></one-
of>
      </item>
      <item>
        <one-of><item>twenty two</item><item><one-of>
<item><ruleref uri="#double"/>two</item><item>two<ruleref
uri="#times"/>
two</item></one-of></item></one-of> <one-of><item>two
</item></one-of>
      </item>
      <item>
        <one-of><item>two hundred and twenty two</item>
<item><one-of><item><ruleref uri="#triple"/>two</item>
<item>three
<ruleref uri="#times"/>two</item></one-of></item></one-of>
      </item>
    </one-of>
    <one-of>
      <item>
        <one-of>
      <item>
          <ruleref uri="#upper"/>x
      </item>
    </one-of>
      </item>
    </one-of>
  </rule>
</grammar>
```

What is claimed is:

1. A computer-implemented method for creating a password grammar for speech recognition comprising:
   normalizing in a computer process a non-semantic password into a non-predictable list of strings of a plurality of character types, the character types including letters, numerals, and non-alphanumeric characters;
   for each string of characters in a given single character type, determining in a computer process one or more corresponding character permutations representing pronounceable combinations of the string; and
   for each character permutation, creating in a computer process a corresponding recognition grammar entry for a speech recognition grammar so as to create a grammar through the complete password including multiple alternative paths.

2. A method according to claim 1, wherein the grammar is a Speech Recognition Grammar Specification (SRGS) grammar.

3. A computer program product encoded in a non-transitory computer-readable medium for creating a password grammar for speech recognition, the product comprising:
   program code for normalizing a non-semantic password into a non-predictable list of strings of a plurality of character types, the character types including letters, numerals, and non-alphanumeric characters;
   program code for determining, for each string of characters in a given single character type, one or more corresponding character permutations representing pronounceable combinations of the string; and program code for creating, for each character permutation, a corresponding recognition grammar entry for a speech recognition grammar so as to create a grammar through the complete password including multiple alternative paths.

4. A computer program product according to claim 3, wherein the grammar is a Speech Recognition Grammar Specification (SRGS) grammar.

* * * * *